(12) United States Patent
Burca

(10) Patent No.: US 7,431,487 B2
(45) Date of Patent: Oct. 7, 2008

(54) CONCATENATED LIGHT PIPE

(75) Inventor: John Burca, Rochester Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 11/462,521

(22) Filed: Aug. 4, 2006

(65) Prior Publication Data

US 2007/0230205 A1 Oct. 4, 2007

Related U.S. Application Data

(60) Provisional application No. 60/788,316, filed on Mar. 31, 2006.

(51) Int. Cl.
*F21V 8/00* (2006.01)
(52) U.S. Cl. .................. 362/555; 362/511; 362/24; 362/26; 362/30
(58) Field of Classification Search ............. 362/555, 362/581, 582, 511, 551, 24, 26, 29, 30; 200/310–317
See application file for complete search history.

(56) References Cited

U.S. PATENT DOCUMENTS

| 4,315,114 | A | | 2/1982 | Monti, Jr. |
| 4,360,722 | A | | 11/1982 | Georgopulos |
| 4,613,736 | A | | 9/1986 | Shichijo et al. |
| 4,670,633 | A | * | 6/1987 | Kaiwa et al. ............... 200/314 |
| 4,997,998 | A | | 3/1991 | Bauer |
| 5,012,054 | A | | 4/1991 | Rada et al. |
| 5,568,367 | A | * | 10/1996 | Park ............................ 362/109 |
| 5,584,145 | A | * | 12/1996 | Teich ............................. 49/506 |
| 5,927,483 | A | | 7/1999 | Yamada |
| 6,080,940 | A | | 6/2000 | Rice |
| 6,388,559 | B1 | | 5/2002 | Cohen |
| 6,492,605 | B2 | | 12/2002 | Iida |
| 6,555,774 | B1 | | 4/2003 | Nielsen |
| 6,964,532 | B1 | | 11/2005 | Lu |
| 7,071,434 | B1 | | 7/2006 | McConnell et al. |
| 2005/0002170 | A1 | | 1/2005 | Jacobs et al. |
| 2005/0017948 | A1 | | 1/2005 | Nguyen et al. |
| 2007/0209914 | A1 | * | 9/2007 | Burca et al. ............... 200/51.11 |

* cited by examiner

*Primary Examiner*—Sharon E Payne
(74) *Attorney, Agent, or Firm*—Brooks Kushman P.C.

(57) ABSTRACT

An illuminated assembly such as an illuminated electronic input control assembly adjusts to the shape of a receiving assembly. The illuminated assembly includes an illumination source module and an illuminated module. Advantageously, the illumination source module and the illuminated module are moveably attached in a manner allowing relative motion which facilitates alignment when the illuminated assembly is placed within a receiving assembly. A garage door opener utilizes this adjustable design. A method of assembling the illuminated assembly is described.

20 Claims, 4 Drawing Sheets

CONCATENATED LIGHT PIPE

CROSS-REFERENCE TO RELATED APPLICATIONS

This application claims the benefit of U.S. Provisional Application Ser. No. 60/788,316 filed Mar. 31, 2006.

BACKGROUND OF THE INVENTION

1. Field of the Invention

The present invention relates to illuminated electronic control assemblies with adjustable positioning of sub-components of the control assemblies, and in particular, to garage door opener systems using such electronic control assemblies.

2. Background Art

The associated costs of electronically controlled systems, and in particular, electronically controlled systems in automobiles provides an ever increasing impetus to find cost reducing strategies. Increasing complexity of such electronically controlled systems along with a desire to integrate such components into a vehicle in an aesthetically pleasing manner adds to the costs of such systems. Such components often include various backlighting configurations such as illuminated buttons and illuminated control indicators. Garage door openers are one example of such electronically controlled systems.

In addition to the costs of the components of such electronic systems, there is also an increased cost associated with the fabrication and assembly of these electronically controlled systems. Since these systems typically include several sub-assemblies that must be put together, physical tolerances of the components, including the illuminated components, become an issue with misalignment being multiplied as the components are assembled. In the case of systems that use switch modules that are manually operated by a user, these misalignments are often associated with sticking or jammed buttons and switches. Garage door openers are an example of such a system using a switch module.

Accordingly, there exists a need for improved illuminated electronic control systems that are easily assembled, and have flexibility with respect to the physical tolerances of any sub-assemblies and components.

SUMMARY OF THE INVENTION

The present invention solves one or more problems of the prior art by providing in at least one embodiment, an illuminated assembly that adjusts to the shape of a receiving assembly. The illuminated assembly of the invention comprises an illumination source module and an illuminated module. The illuminated module optionally includes one or more actuators that are manually activated by a user. Advantageously, the illumination source module and the illuminated module are moveably attached in a manner allowing relative motion. The relative positionability of the illumination source module to the illuminated module facilitates alignment with a receiving assembly that includes mounting or bezel openings.

In another embodiment of the invention, a method for assembling an electronic control device such as a garage door opener is provided. The method of this embodiment comprises attaching an illumination source module to an illuminated module. The illumination source module includes first connectors while the illuminated module includes second connectors that are connected to the first connectors such that the illumination source module is moveable relative to the illuminated module. The thus formed control assembly is positioned within a receiving assembly. The relative positions of the illumination source module and the illuminated modules are adjusted such that the control assembly is aligned with the shape receiving assembly without any buttons of the illuminated module sticking to the receiving assembly.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

As used herein, the term "illumination module" means a device that includes a light source such as a light bulb or light emitting diode. A light source module may also be an input control module as defined below.

As used herein, the term "illuminated module" means a device that includes one or more features that are illuminated. For example, in many applications buttons are advantageously back lighted.

As used herein, the term "input control module" means an electronic device containing an input device that allows a person to enter data into or control another device. Typically, such input devices are switches that are actuated by a user. Input control modules are used in any electronically controlled or operated device or system (e.g., garage door openers, keyless entry systems, keyboards, and the like).

As used herein, the term "actuator module" means a module that includes the physical devices manually operated by a user operating the input control module. Typically, such actuator modules include buttons or switches that are activated by the users. The actuator module includes one or more physical structures (i.e., actuators) that transfer the user input to the input control module.

Figure 1:
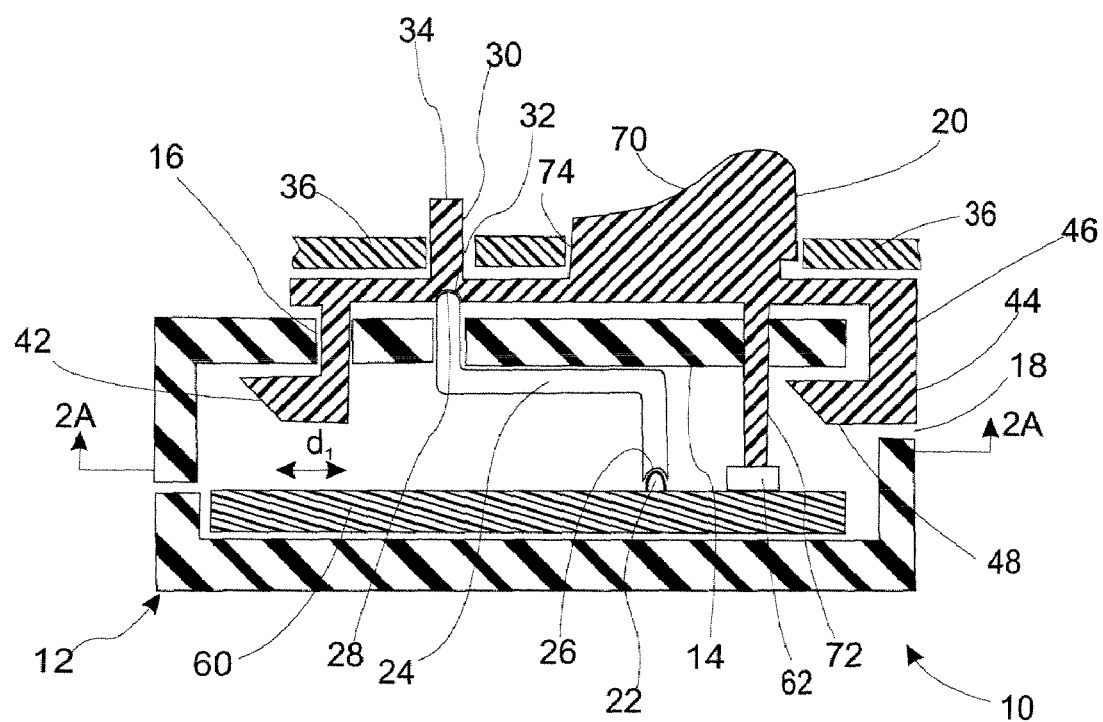
FIG. 1 is an idealized cross-section of an illuminated assembly of an embodiment of the present invention that includes an illumination source module and an illuminated module.
Figure 2A:
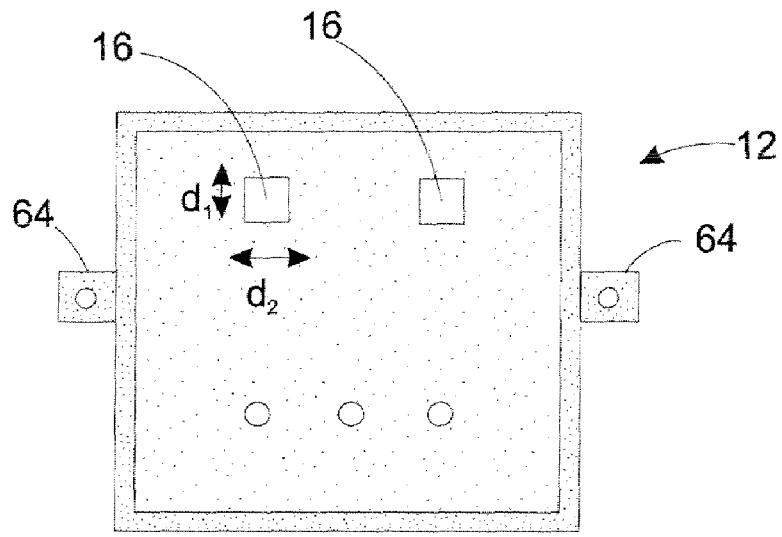
FIG. 2A is a cross-section of the illuminated module illustrated in FIG. 1.
Figure 2B:
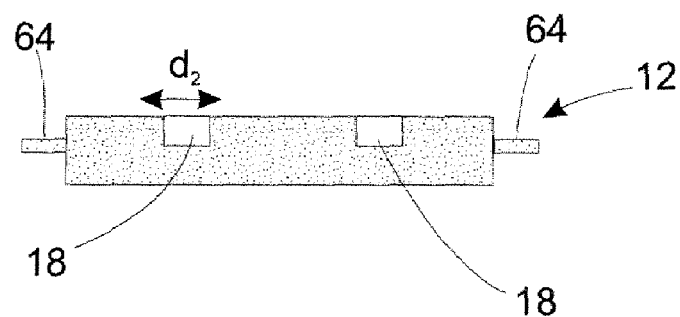
FIG. 2B is a side view of the illuminated module illustrated in FIG. 1A.

In one embodiment of the present invention, an illuminated assembly attachable to a receiving assembly is provided. With reference to FIGS. 1, 2A, and 2B, schematics of the illuminated assembly of the present invention are provided. FIG. 1 is an idealized cross-section of the illuminated assembly which includes an illumination source module and a viewable illuminated module. FIG. 2A shows an idealized section of the illumination source module. FIG. 2B is a side view of the illumination source module. Illuminated assembly 10 includes illumination source module 12 having side 14 that defines one or more first connectors 16, 18. In one variation of the present embodiment, first connectors 16, 18 are slots of various configurations. Illuminated assembly 10 also includes illuminated module 20. Illumination source module 12 includes light source 22 and first light pipe 24. Although virtually any light source compatible with the spatial dimensions of an illuminated assembly may be used for light source 22, light emitting diodes and light bulbs are particularly useful. First light pipe 24 has first light input surface 26 and first light output surface 28. First light pipe 24 receives light from light source 22 through first light input surface 26 transmitting at least a portion of the light out of the first light output surface 28. Illuminated module 20 includes second light pipe 30. Second light pipe 30 includes second light input surface 32 and second light output surface 34. Second light input surface 32 is adapted to moveably couple to first light output surface 28 thereby allowing adjustment of the relative positions of first light pipe 24 and second light pipe 30 such that at least a portion of light entering first light pipe 24 is transmitted to second light pipe 30. This arrangement provides illumination from second light output surface 34 while allowing adjustment of the relative positions of illumination source module 12 and illuminated module 20 so that illuminated assembly 10 adjusts to the shape of receiving assembly 36. For this purpose, illuminated module 20 includes one or more second connectors 42, 44 which are used to attach illuminated module 20 to illumination source module 12. Typically, second connectors 42, 44 are barbed extensions having extension section 46 and barb section 48.

First light pipe 24 and second light pipe 30 are formed from a visible light transmitting material. Suitable examples of such light transmitting material include, but are not limited to, glass, acrylic, polycarbonate, and combinations thereof. In a variation of the present invention, first light output surface 26 is concave and the second light input surface 32 is convex such that first light output surface 26 is moveable within a cavity defined by second input surface 32 such that light emanating from first light output surface 26 enters second light input surface 32.

Still referring to FIGS. 1, 2A, and 2B, attachment of illumination source module 12 to illuminated module 20 is accomplished by positioning second connectors 42, 44 within first connectors 16, 18 such that illumination source module 12 is moveable relative to the illuminated module 20 allowing adjustment of the relative positions of illumination source module 12 and illuminated module 20. This relative moveablity allows illuminated assembly 10 to adjust to the shape of receiving assembly 36. In a variation of this embodiment, second connectors 42, 44 are moveable within first connectors 16, 18 along two orthogonal directions $d_1$ and $d_2$. Although the extent of the motion along directions $d_1$ and $d_2$ are of any amount compatible with the sizes of the components, typically second connectors 42, 44 are moveable within first connectors 16, 18 over a distance of about 0.25 inches or less along each of the two orthogonal directions. Adjustability over this distance scale provides sufficient adjustability to allow illuminated assembly 10 to align to the shape of receiving assembly 36. It should be appreciated that in the most general implementation of the invention, the term first and second connectors merely means a mated pair of structures that fit together for the purpose of connecting illumination source module 12 to illuminated module 20. Accordingly, any specific implementation of the first and second connectors may be switched.

In another embodiment, the present invention is advantageously combined with the electronic control assembly of co-pending application Ser. No. 11/276,667 (the '667 application) filed Mar. 9, 2006 as specifically illustrated in FIGS. 1, 2A, and 2B. The entire disclosure of this patent application is hereby incorporated by reference. In a variation of this embodiment, illuminated assembly 10 is an electronic input control assembly, illumination source module 12 is an input control module and illuminated module 20 is an actuator module as disclosed in the '667 application. In a variation of the present invention when illuminated assembly 10 is an electronic input control assembly as in the '667 application, illumination source module 12 also includes electronic device 60 which includes one or more electronic components 62 that are activated by illuminated module 20. In a variation of the present embodiment, electronic device 60 comprises an electronic circuit board and electronic components 62 are switches (e.g., tact switches). Illumination source module 12 also includes attachment section 64 which are utilized to attach illuminated assembly 10 to receiving assembly 36. Examples of such receiving assemblies include vehicle bezel or trim components.

In a variation of the present embodiment, illuminated module 20 includes at least one button(s) 70 with attached actuator shaft(s) 72. In this variation, actuator 20 is a switch module. When button 70 is manually activated by a user, actuator shaft 72 engages electronic component 62 thereby initiating the pre-designed action of illumination source module 12 associated with electronic component 62's activation (or deactivation). In one particularly important variation, input module 12 is part of a garage door opener system, and in particular, a transmitter for a garage door opener system which is integrated into the passenger compartment of an automobile. In a variation of the present embodiment, receiving assembly 36 includes a mounting plate having openings 74 into which button 70 protrudes. It is readily appreciated that it is the relative moveability of illumination source module 12 and illuminated module 20 that allows for button(s) 70 to properly fit into openings 74 in receiving assembly 36 without sticking. Optionally, button(s) 70 may be over-coated with a soft touch layer.

Figure 3:
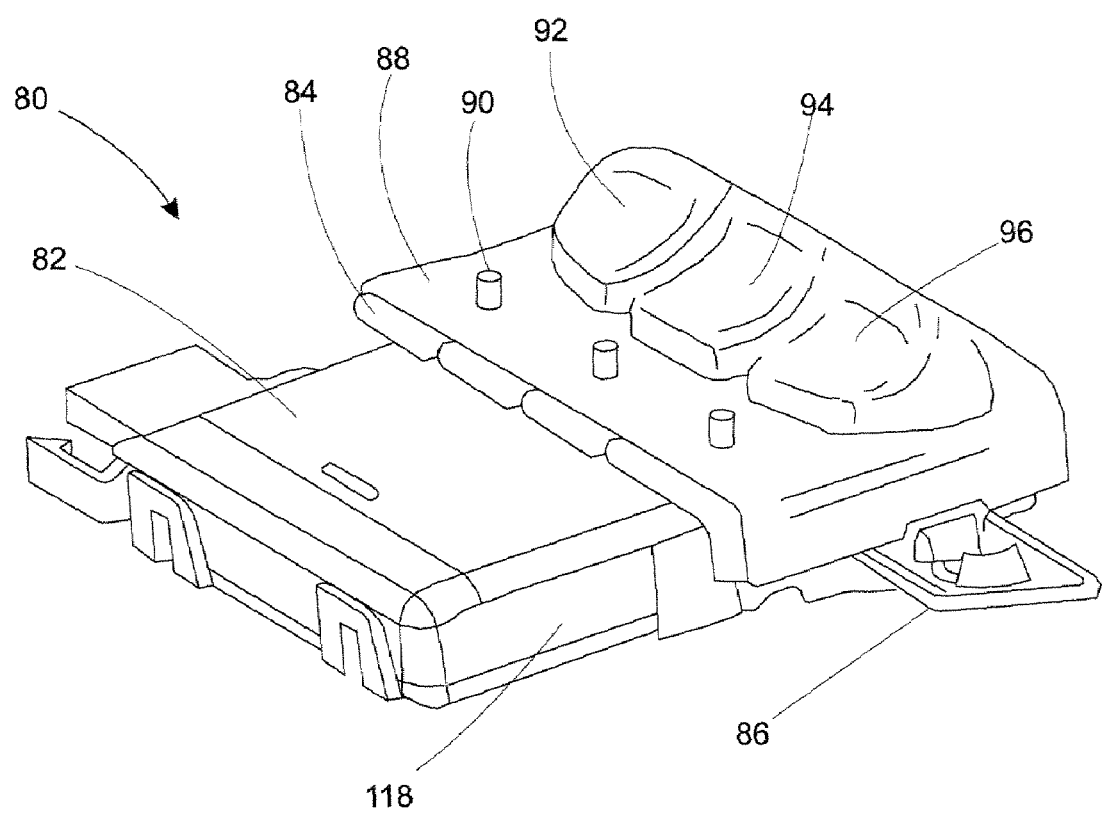
FIG. 3 is a perspective view of a garage door opener of an embodiment of the present invention.

In another embodiment of the present invention, a garage door opener utilizing the design of the illuminated assembly 10 set forth above is provided. The garage door opener of this embodiment is advantageously incorporated into the overhead console of a vehicle interior. With reference to FIG. 3, a perspective view of the garage door opener of this embodiment is provided. Garage door opener transmitter 80 includes illumination source module 82 and illuminated module 84. Illumination source module 82 and illuminated module 84 are connected together in the manner set forth above and in the '667 application. Illuminated module 84 is optionally covered with soft touch layer 88. Illuminated module 84 includes buttons 92, 94, 96. In one variation, illuminated module 84 is a switch module.

Figure 4:
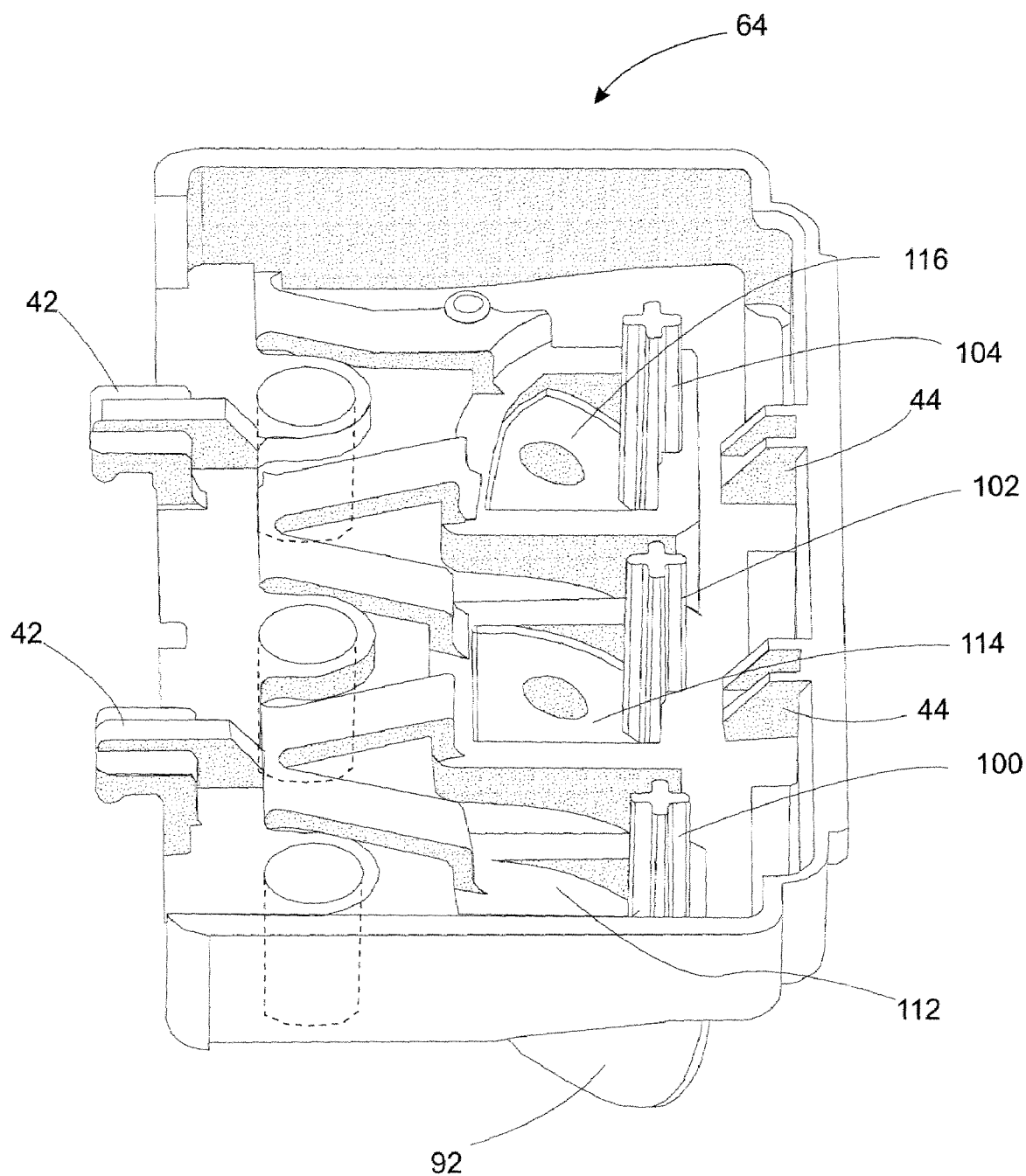
FIG. 4 is a perspective view of the the illuminated module in the garage door opener of FIG. 3.

With reference to FIGS. 3 and 4, schematics illustrating components of garage door opener transmitter 80 are provided. FIG. 4 is a perspective view of illuminated module 84. Illuminated module 84, as illustrated, is a switch module that includes buttons 92, 94, 96. Actuator shafts 100, 102, 104 are attached to bottom sides 112, 114, 116 of buttons 92, 94, 96. Actuator shafts 100, 102, 104 contact switches in illumination source module 82 upon operation of buttons 92, 94, 96 by a user. In a variation of the present embodiment, operation of buttons 92, 94, 96 will initiate the opening and closing of a garage door. In a variation, illumination source module 82 includes an encasement. The detail of the manner in which such an encasement is closed along a hinge are set forth in the '667 application. In a further variation, an electronic device such as a printed circuit board is positioned within encasement. The electronic device includes one or more switches that are activated by buttons 92, 94, 96 and actuator shafts 100, 102, 104 as set forth above.

In another embodiment of the present invention, a method for assembling an electronic control device is provided. With reference to FIGS. 1, 2A, and 2b, illuminated assembly 10 is assembled by attaching illumination source module 12 to illuminated module 20. Illuminated module 20 is attached to the illumination source module 12 by positioning second connectors 42, 44 within first connectors 16, 18 such illumination source module 12 is moveable relative to illuminated module 20 due to moveability of second connectors 24, 44 relative to first connectors 16, 18. Illuminated assembly 10 is then positioned within receiving assembly 36. Receiving assembly 36 is adapted to receive illuminated assembly 10 and includes a mating region having a shape that conforms to at least a portion of the illuminated assembly 10 within predetermined tolerances. Utilizing the relative moveablitiy between illumination source module 12 and illuminated module 20, the relative position of illumination source module 12 and illuminated module 20 is adjusted such that the control assembly is aligned with the shape of the mating region.

The details of illuminated assembly 10 are set forth above. In particular, the position adjustment of the present embodiment is accomplished by the relative movement of second connectors 42, 44 with first connectors 16, 18 along the two orthogonal directions $d_1$ and $d_2$. In a variation, second connectors 42, 44 are moveable within first connectors 16, 18 over a distance of about 0.25 inches or less along each of the two orthogonal directions.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An illuminated assembly attachable to a receiving assembly, the control assembly comprising:
    an illumination source module having a light source and a first light pipe, the first light pipe having a first light input surface and a first light output surface, the first light pipe receiving light from the light source through the first light input surface and transmitting at least a portion of the light out of the first light output surface; and
    an illuminated module having a second light pipe, the second light pipe having a second light input surface and a second light output surface, the second light input surface adapted to moveably couple to the first light output surface thereby allowing adjustment of the relative positions of the first light pipe and the second light pipe such that at least a portion of light entering the first light pipe is transmitted to the second light pipe thereby providing illumination from the second light output surface, wherein the illumination source module and illuminated module are moveable along two orthogonal directions so that the control assembly can be aligned with the shape of a mating region during assembly so that the control assembly adjusts to the shape of the receiving assembly.

2. The illumination assembly of claim 1 wherein the light source is a light emitting diode.

3. The illumination assembly of claim 1 wherein the first and second light pipes each independently comprise a visible light transmitting material.

4. The illumination assembly of claim 3 wherein the visible light transmitting material include a material selected from the group consisting of glass, acrylic, polycarbonate, and combinations thereof.

5. The illuminated assembly of claim 1 wherein the first light output surface is concave and the second light input surface is convex such that the first light output surface is moveable within a cavity defined by the second input surface wherein light emanating from the first light output surface enters second light input surface.

6. The illuminated assembly of claim 1 wherein the illumination source module further comprises one or more first connectors and the illuminated module further comprises one or more second connectors.

7. The illuminated assembly of claim 6 wherein the one or more first connectors comprise one or more slots and the one or more second connectors comprise one or more barbed extensions attached to the illuminated module.

8. The illuminated assembly of claim 6 wherein the illumination source module is an input control module and illuminated module is an actuator module, the actuator module comprising the second light pipe, at least one button, and an actuator shaft attached to the at least one button.

9. The illuminated assembly of claim 6 wherein the illumination source module comprises the light source and an electronic device having a switch in communication with the actuator shaft such that activation of the at least one button causes operation of the switch.

10. The illuminated assembly of claim 7 wherein the electronic device is part of a garage door opener.

11. An illuminated electronic input control assembly attachable to a receiving assembly, the control assembly comprising:
    an input control module having one or more first connectors, a light source and a first light pipe, the first light pipe having a first light input surface and a first light output surface, the first light pipe receiving light from the light source through the first light input surface and transmitting at least a portion of the light out of the first light output surface; and
    an actuator module having one or more second connectors, a second light pipe, the second light pipe having a second light input surface and a second light output surface, the second light input surface adapted to moveably couple to the first light output surface, the actuator module being attached to the input control module with the one or more first connectors connected to the one or more second connectors such that the input control module is moveable relative to the actuator module allowing adjustment of the relative positions of the first light pipe and the second light pipe such that at least a portion of light entering the first light pipe is transmitted to the second light pipe thereby providing illumination from the second light output surface, wherein the illumination source module and illuminated module are moveable along two orthogonal directions so that the control assembly can be aligned with the shape of a mating region during assembly so that the control assembly adjusts to the shape of the receiving assembly.

12. The illumination assembly of claim 11 wherein the light source is a light emitting diode.

13. The illumination assembly of claim 11 wherein the first and second light pipes each independently comprise a visible light transmitting material.

14. The illumination assembly of claim 11 wherein the visible light transmitting material includes a material selected from the group consisting of glass, acrylic, polycarbonate, and combinations thereof.

15. The illuminated assembly of claim 11 wherein the first light output surface is concave and the second light input surface is convex such that the first light output surface is moveable within a cavity defined by the second input surface wherein light emanating from the first light output surface enters second light input surface.

16. The illuminated assembly of claim 11 wherein the actuator module further comprises at least one button, and an actuator shaft attached to the at least one button.

17. The illuminated assembly of claim 11 wherein the input control module further comprises an electronic device having a switch in communication with and actuator shaft such that activation of the at least one button causes operation of the switch.

18. The illuminated assembly of claim 17 wherein the electronic device is part of a garage door opener.

19. A method for assembling an illuminated electronic control device, the method comprising:
  a) attaching an input control module having one or more first connectors to an actuator module having one or more second connectors to form a control assembly, the input control module having one or more first connectors, a light source, and a first light pipe, the first light pipe having a first light input surface and a first light output surface, the first light pipe receiving light from the light source through the first light input surface and transmitting at least a portion of the light out of the first light output surface and the actuator module having one or more second connectors, a second light pipe, the second light pipe having a second light input surface and a second light output surface, the second light input surface adapted to moveably couple to the first light output surface wherein the actuator module is attached to the input control module with the one or more second connectors positioned within the one or more first connectors such the input control module is moveable relative to the actuator module and the first light pipe is moveable relative to the second light pipe;
  b) positioning the control assembly within a receiving assembly, the receiving assembly having a mating region having a shape that conforms to at least a portion of the control assembly within predetermined tolerances, the receiving assembly being adapted to receive the control assembly; and
  c) adjusting the relative positions of the input control module and the actuator modules such that the control assembly aligns with the shape of the mating region.

20. The control assembly of claim 19 wherein the actuator module comprises at least one button and an actuator shaft attached to the at least one button.

* * * * *